Jan. 2, 1951 E. L. CLARK ET AL 2,536,839
POWER RECOVERY CATHODE-RAY BEAM DEFLECTION SYSTEM
Filed May 24, 1949
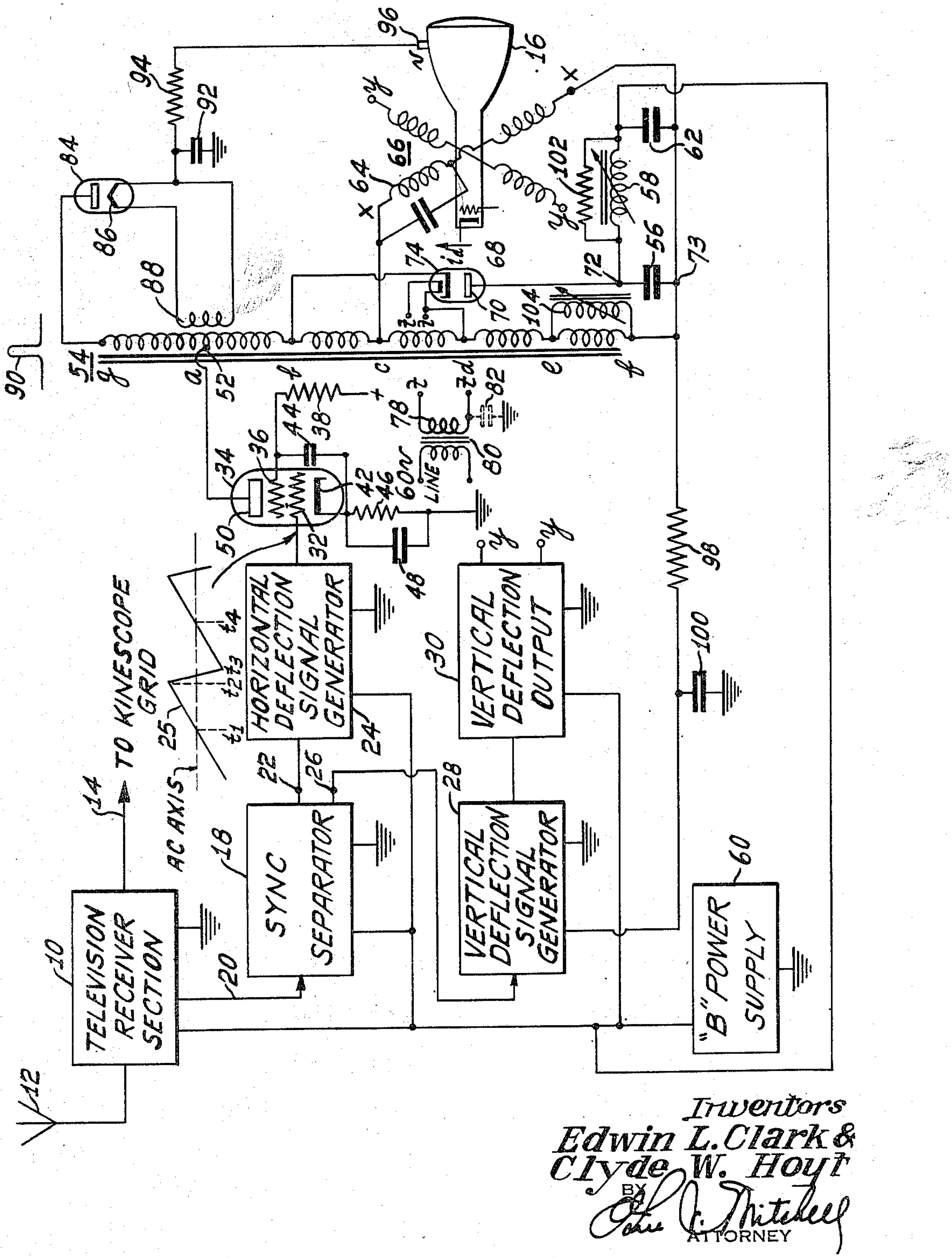
Inventors
Edwin L. Clark &
Clyde W. Hoyt
BY
ATTORNEY Patented Jan. 2, 1951 2,536,839

UNITED STATES PATENT OFFICE 2,536,839

POWER RECOVERY CATHODE-RAY BEAM DEFLECTION SYSTEM

Edwin L. Clark, Collingswood, and Clyde W. Hoyt, Merchantville, N. J., assignors to Radio Corporation of America, a corporation of Delaware Application May 24, 1949, Serial No. 95,107

16 Claims. (Cl. 315—27)

This invention relates to improvements in cathode ray beam deflection systems, and more particularly, to high efficiency reaction scanning type power recovery circuits commonly used in conjunction with television image scanning and reproducing cathode ray tubes.

The present invention deals more directly with a cathode ray beam deflection system of the "B" boost variety suitable for use in television equipments wherein it is desirable to make limited use of the boosted "B" voltage so obtained for the operation of other circuits requiring high operating potentials at low current drain.

In one of its more specific aspects, the present invention is an improvement on a deflection circuit shown and described in a co-pending U. S. patent application by E. L. Clark, Serial No. 95,106, filed May 24, 1949, entitled "High Efficiency Cathode Ray Beam Deflection Systems," filed concurrently herewith, which describes a novel combination deflection circuit and high voltage cathode ray beam accelerating potential generator.

As discussed more fully in the above-mentioned U. S. patent application by Edwin L. Clark, the rapid growth of the television art has stimulated a search for more economical and efficient cathode ray beam deflection circuits, particularly of the type suitable for commercial television receivers. In line with this, it has been found possible to take more complete advantage of the energies involved in electromagnetic systems and in addition to deriving therefrom energy for driving an electromagnetic deflection yoke, some energy is employed to develop a high unidirectional potential of a value suitable for cathode ray beam acceleration. An even further step along these lines has been the recovery of power from the damping circuit associated with the electromagnetic deflection yoke of a portion of the energy which is subsequently transformed, by some form of "B" boost circuit, into energy available for use by the deflection output tube.

Such operating methods tending for higher efficiency and manufacturing economy have found expression in a variety of circuit arrangements. For instance, in the above-referenced deflection system by Edwin L. Clark, a particularly high efficiency deflection system is provided which employs a rather inexpensive autotransformer having a portion of its winding serially connected in the anode-cathode circuit of the deflection output tube. The autotransformer winding is in fact separable into at least two winding sections, the adjacent and more central terminals of the respective winding sections being novelly connected by a storage capacitor advantageously employed for recovery of damping energy in the form of "B" boost. As in many other types of "B" boost circuits, voltage developed at the storage element, and serially applied to the deflection output tube anode-cathode circuit for increasing the net anode-cathode potential, contains a relatively high amplitude pulse component due to the transient developed during the retrace or "flyback" interval of the deflection cycle.

Since it is sometimes desirable in television receivers to make limited application of this "B" boost voltage to other circuits in the receiver, such as, for example, the vertical and horizontal deflection signal generators, the pulse component of the "B" boost voltage may be considered very objectionable. Removal of the pulse component by filter means requires either a rather expensive and bulky filter or a more inexpensive RC filter having such a high series impedance as to greatly reduce the utility of its output as a source of operating potential.

It is therefore an object of the present invention to provide a high efficiency cathode ray beam deflection system which is productive of a "B" boost voltage of a type more suitable for use by adjacent circuits situated for connection therewith.

Another object of the present invention resides in the provision of an electromagnetic cathode ray beam deflection circuit which develops a "B" boost voltage having virtually no "flyback" pulse component thereby making the boosted "B" voltage available for use by circuits other than the deflection circuit with the need of a minimum of filtering or circuit decoupling.

Another object of the present invention is to provide an improved deflection circuit having all the features of advantage of the deflection circuit described in the U. S. patent application, Serial No. 95,106, filed May 24, 1949, entitled "High Efficiency Cathode Ray Beam Deflection Systems" by E. L. Clark filed concurrently herewith but additionally providing a "B" boost voltage more suitable for direct application in supplying limited power requirements of other circuits having relatively high voltage low current "B" power demands.

In order to accomplish the above objects, the present invention in its general form contemplates the use of an autotransformer having at least a portion of its winding connected in series with the anode-cathode circuit of a deflection output discharge tube. An electromagnetic yoke is then connected in shunt with another portion of the autotransformer winding for impedance coupling with the anode-cathode circuit of the output discharge tube. To obtain a substantially pulse-free "B" boost voltage which characterizes the present invention, a "B" boost capacitor is inserted in series with the autotransformer at its regular "B" power supply extremity and a damping device connected in damping relationship with the autotransformer through this capacitor. Since the capacitor is at the "B" power supply extremity of the autotransformer, substantially no "flyback" pulse will appear in its more positive terminal. To obtain linearity control in the arrangement, an inductance is placed in series with the damping device between the damping device anode and the "B" boost capacitor. A linearity control capacitor is then placed in shunt with the linearity control inductance through the "B" boost capacitor. Variations in the value of the linearity control inductance, in combination with the resonant circuit formed by the linearity control and "B" boost capacitor, causes a suitable waveform of control bias to be applied to the damping device.

The invention possesses numerous other objects and features of advantage some of which together with the foregoing will be set forth in the following description of specific apparatus embodying and utilizing its novel method. It is therefore to be understood that the present invention is applicable to apparatus other than that shown in the drawings as other advantageous embodiments of the present invention as set forth and defined in the appended claims will naturally occur to those skilled in the art after having benefited from the teachings of the following description taken in connection with the accompanying drawing in which the figure schematically illustrates one form of the present invention as applied to a television receiver type cathode ray beam deflection system.

Turning now to the figure, there is represented by the block 10 a section of a typical television receiver which may include an RF amplifier, an oscillator, converter, IF amplifier, video demodulator, video amplifier and sync clipper. Details of these circuits as well as other television receiver circuits, hereinafter represented in block form, will be well known to those skilled in the television art, examples of which, however, are shown in an article entitled "Television Receivers" by Antony Wright appearing in the March 1947 issue of the RCA Review.

The input of the television receiver 10 is accordingly provided with signals intercepted by an antenna 12 which are amplified by the receiver and demodulated to appear at the output 14 indicated for connection to the modulating grid or electrode of the cathode ray image reproducing tube 16. The video signals demodulated within the receiver are suitably clipped to provide horizontal and vertical sync pulses for input to the sync separator circuit 18 by a connection 20. The horizontal synchronizing pulses then appearing at the output terminal 22 of the sync separator are applied for synchronization of the horizontal deflection signal generator 24 while the vertical synchronizing pulses appearing at the sync separator output terminal 26 are applied for synchronization of the vertical deflection signal generator 28. The output of the vertical deflection generator 28 is conventionally connected for driving on the vertical deflection output stage 30 while the output of the horizontal deflection signal generator 24 is applied for driving of the grid 32 of the horizontal deflection output discharge tube 34. Suitable biasing potential for the discharge tube screen 36 is supplied from a source of positive potential 38 through screen dropping resistor 40 which is in turn by-passed to the cathode 42 by by-pass capacitor 44. A self-biasing cathode resistor 46 whose value is chosen in accordance with a desirable operating bias is conventionally connected in the cathode circuit of the discharge tube 34 which resistor is by-passed by capacitor 48.

According to the present invention, the anode 50 of the deflection output discharge tube 34 is connected with one terminal 52 of an autotransformer 54. The autotransformer 54 is provided with a plurality of winding taps, such as *a*, *b*, *c*, *d*, *e*, *f*, and *g*, terminal *f* of which is connected through a "B" boost capacitor 56 and linearity control inductance 58 to a source of positive "B" potential, such as 60.

Another capacitor, such as 62, across which is developed a portion of the "B" boost voltage and which aids in the linearity control action of the inductance 58, is directly connected from the autotransformer terminal *f* to the "B" power supply 60. The horizontal deflection winding 64 of the cathode ray deflection yoke 66 is then connected substantially in shunt with that portion of the autotransformer winding between terminals *c* and *f*. The yoke damping device comprising, for example, the discharge tube 68 is then connected in damping relation with the yoke winding 64 through the "B" boost capacitor 56, and the linearity inductance 58 taken in combination with the capacitor 62.

Accordingly, the anode of the damper device 70 is connected with the "B" power supply extremity 72 of the capacitor 56 while the damper cathode 74 is connected with terminal *b* of the autotransformer.

Although not forming a particular part of the present invention, the damping device 68 is shown as having its heater 74 excited from the secondary 78 of a heater transformer 80. The heater 74 is then returned to tap *d* on the autotransformer secondary so that the stray capacity-to-ground 82 of the heater transformer secondary 78 is not placed in total across the transformer winding portion embraced by the anode-cathode circuit of the damper. As more fully described in a co-pending U. S. patent application by Otto H. Schade entitled "High Efficiency Beam Deflection System," Serial No. 95.096, filed May 24, 1949, this reduction in the capacitive effects of the damper heater winding increase the resonant frequency of the electromagnetic system associated with the deflection yoke, thereby making possible a faster deflection "flyback" rate.

Moreover, a relatively high impedance continuation of the autotransformer winding defined between the terminals *a* and *g* is connected across the rectifier diode 84 whose heater 84 is energized by a separate winding 88 magnetically coupled to the autotransformer. The pulse energy represented by the "flyback" pulse 90, which occurs during the "flyback" period $t_2$—$t_3$ of the deflection cycle, is thereby transformed to a high unidirectional potential across the storage capacitor 92. This potential is then applied through resistance 94 to the accelerating anode 96 of the cathode ray tube 16. The advantages to be derived from the use of a high voltage pulse step-up winding wound on the magnetic structure of the autotransformer are described in greater detail in the above mentioned U. S. patent application by Edwin L. Clark, supra. The illustration of this high voltage pulse step-up arrangement, as well as the capacitive nullifying connection of the diode 68 are therefore seen to be merely exemplary of general high efficiency deflection circuit techniques with which the present invention is ideally associated. However, the utility of the present invention is in no way limited to the use of either or both of these circuit expediencies.

Considering now the operation of the arrangement in the figure, in accordance with well-known principles of reaction scanning as described, for example in an article entitled "Magnetic Deflection Circuits" appearing in vol. 8 of the RCA Review dated September 1947 by Otto H. Schade, the bias on the output discharge tube 34 is so adjusted that during operation the driving sawtooth 24, provided by the horizontal deflection signal generator 24, will produce anode-cathode conduction only during a period corresponding to a little more than half a deflection cycle.

Accordingly, in explanation of the specific novel operation of the invention's embodiment in the figure, it shall be assumed that the output discharge tube 34 is rendered conductive by the sawtooth 25 only during the time $t_1$—$t_2$, during which interval anode-cathode current will pass from the positive source of supply 60 through the inductance 58 through the diode 68 and through the winding section *a*—*b* of the autotransformer to the anode 50 of the output discharge tube 50. This, of course, will induce some deflection voltage and current in the winding section *c*—*b*, which will cause a substantially linear rise of deflection current to flow through the yoke winding 64. At the end of time $t_2$, corresponding to the beginning of the "flyback" interval of the deflection cycle, the discharge tube 34 becomes non-conductive and the magnetic fields in the autotransformer and yoke will then collapse causing ringing of the magnetic circuit at its self-resonant frequency, normally designed to be at least 4 to 5 times that of the deflection frequency.

After one-half of free oscillation, the voltage appearing across the horizontal winding 64 will be of such polarity to cause the diode 68 to conduct and thereby damp the energy magnetically stored in the yoke at this time. The direction of the damping current $i_d$ through the diode will be in the direction of the arrow which will tend to charge the capacitors 56 and 72 such that their discharge tube anode extremities are positive with respect to the "B" power supply potential source 60. This discharge current $i_d$, in accordance with well-known reaction scanning principles, will of course provide the first portion of the current sawtooth through the yoke winding 64, which portion will correspond to the time $t_3$—$t_4$ of the driving sawtooth 25. By the time $t_4$, the horizontal discharge tube 34 will have been rendered conductive and this time due, to the bias across capacitors 56 and 72, the diode 70 will not immediately conduct, which will consequently permit most of the horizontal output discharge tube anode-cathode current to flow through the autotransformer section *b*—*f* by means of capacitors 56 and 62. Upon establishing the proper turns ratio between the autotransformer section *a*—*b* and section *b*—*f*, equilibrium will be found between the current discharged from the capacitors 56 and 62 by discharge tube anode-cathode circuit, and the energy the capacitors receive from the damping current of the diode 68. This, of course, corresponds to the turns ratio value, making the average damper current $i_d$ substantially equal to the average horizontal output discharge tube anode-cathode current. It will be apparent from the circuit operation that the voltage appearing at the output discharge tube extremity 73 of the capacitor 56 will be positively in excess of the B+ voltage appearing at terminal 72 and therefore a boosted "B" potential will be applied to the anode 50 of the output discharge tube. In the light of the previous description, this effective boost in "B" voltage is attributable to energy recovered from the magnetic circuit through the agency of the damping diode 68.

According to the present invention, in order to afford means for adjusting the waveform of the resulting deflection current through the yoke 66, linearity inductance 58 has been imposed both in series with the output discharge tube anode-cathode circuit and the damping discharge tube anode-cathode circuit as shown. The capacitor 62 is placed in shunt with this linearity inductance 58 through its connection with the capacitor 56. The parabolic waveform then developed across the inductance 58 may by varying the value of the inductance 58 be so adjusted in phase as to correct the otherwise substantially perfect saw-tooth through the yoke winding 64 so that deflection distortion due to the screen flatness of most cathode ray tubes is virtually overcome.

Moreover, in accordance with one of the principal features of the present invention, the boosted "B" voltage appearing at terminal 72 of the "B" boost capacitor 56 may be connected for supply of the "B" power requirements of any low current stage such as the vertical deflection signal generator 28 without imposing much filter therebetween. A reduction in the degree of filtering necessarily provided by the resistance 98 in combination with the capacitor 100 is made possible by the circuit arrangement of the present invention because the point at which the "B" boosted voltage appears (terminal 73 of capacitor 56) is not at a position in the circuit where the "flyback" pulse 90 is present. Thus, the only filtering necessary will be for the small ripple in "B" boost voltage due to the cyclic rate of the deflection output stage as well as voltage variations appearing across the inductance 58. This will necessarily reduce the value of the series resistance 98 thereby presenting to the vertical deflection signal generator 24 a much lower impedance source of "B" power than would have otherwise been possible.

In the practice of the present invention, it is sometimes preferred to shunt the linearity inductance 58 with a resistance 102 thereby reducing the Q of the waveform correcting circuit. Moreover, it will be understood that although the damping device 68 has been shown as a vacuum diode and the output discharge tube 34 has been shown as a vacuum pentode, other discharge tube types may be readily employed without, in any way, departing from the spirit of the present invention. Furthermore, it will be obvious from an understanding of the description hereinabove that the relative positions of the yoke 64 and the diode-cathode 74 to the respective taps *c* and *b* of the autotransformer secondary may be varied to any desirable extent depending upon the actual value of the circuit parameters involved in specific cases.

For sake of convenience, a variable second inductance 104 has been shown in shunt with the winding *e*–*f* of the autotransformer. Variation of the value of this inductance will, according to well known action, vary the amplitude of the deflection current applied to the deflection yoke winding 64 and act as a form of width control. Naturally, depending upon the value of the inductance 104, its connection to the autotransformer may be at any convenient point.

From the foregoing it can be seen that the applicants have provided a simple, novel and effective "B" boost deflection circuit having particular usefulness in television circuits and one which is productive of a "B" boost voltage suitable for utilization by circuits other than deflection circuits per se with the need of but a small degree of filter.

Having thus described the invention, what we claim is:

1. In an electromagnetic deflection system for a cathode ray tube having associated therewith an electromagnetic beam deflection yoke suitable for coupling with the anode-cathode circuit of a deflection output discharge tube, the combination of, an autotransformer having primary winding connections and secondary winding connections which embrace a portion of the transformer winding between said primary winding connections, a first capacitor and inductance connected in series to form a combination, circuit means placing said transformer primary connections in series with said capacitor-inductance series combination, the series connection of said transformer-primary and said capacitor-inductance combination being in turn placed in series with the anode-cathode circuit of the deflection output discharge tube, connections for placing the cathode ray beam deflection yoke across the autotransformer secondary connections, a unilaterally conductive discharge device connected in damping relationship with said deflection yoke, one terminal of said damping device being connected at the junction of said first capacitor and inductance, and a second capacitor connected from the deflection output discharge tube cathode extremity of said series inductance to the autotransformer extremity of said first capacitor.

2. In an electromagnetic deflection system for a cathode ray tube having associated therewith an electromagnetic beam deflection yoke suitable for coupling with the anode-cathode circuit of a deflection output discharge tube, the combination of, an autotransformer having primary winding connections and secondary winding connections which embrace a portion of the transformer winding between said primary winding connections, a first capacitor and inductance connected in series to form a combination, circuit means placing said transformer primary connections in series with said capacitor-inductance series combination, the series connection of said transformer primary and said capacitor-inductance combination being in turn placed in series with the anode-cathode circuit of the deflection output discharge tube, connections for placing the cathode ray beam deflection yoke across at least two of the autotransformer secondary connections, a unilaterally conductive damping device having an anode and a cathode, a connection between said damping device cathode and said autotransformer secondary winding, a connection from said damping device anode to the inductance of said capacitor-inductance series combination, and a second capacitor connected between the output discharge tube cathode extremity of said series inductance and the autotransformer extremity of said first capacitor.

3. Apparatus according to claim 2 wherein there is additionally provided on said autotransformer a high-voltage pulse step-up winding galvanically and magnetically coupled to the primary winding of said autotransformer, and means for rectifying the energy appearing across said high-voltage pulse step-up secondary winding thereby to develop a unidirectional potential whose value is a function of the LC ratio between said first capacitor and said series combination inductance.

4. Apparatus according to claim 2 wherein there is provided another variable inductance connected in shunt with a portion of said autotransformer winding whereby the amplitude of deflection in said deflection yoke may be varied.

5. In an electromagnetic cathode ray beam deflection system of the type employing electromagnetic deflection yoke suitable for excitation by coupling to the anode-cathode circuit of a deflection output discharge tube, the combination of, an autotransformer having a portion of its winding directly connected in the anode-cathode circuit of the output discharge tube, means connecting the cathode ray deflection yoke in shunt with a portion of said autotransformer winding, a damping device having at least three electrodes, a connection from each of said damping device electrodes to separate points on said autotransformer winding whereby any capacitive effects associated with one of said damper electrodes will be electromagnetically attenuated in its effect on another of said damping device electrodes, a first capacitor connected in series with said autotransformer in the output discharge tube anode-cathode circuit as well as in series with said damping device in its connection across a portion of said autotransformer and a series combination of an inductance and second capacitor placed in shunt with said first capacitor, the inductance of said series combination being included only in the anode-cathode circuit of said deflection output discharge tube.

6. Apparatus according to claim 5 wherein said damping device comprises an electron discharge tube and said three electrodes thereof comprise respectively a heater, cathode and anode.

7. Apparatus according to claim 6 wherein said damping device electron discharge tube cathode is connected to a point on said autotransformer, which is less remote from said output discharge tube anode than the point to which said damping discharge tube heater is connected.

8. Apparatus according to claim 6 wherein said damping discharge device cathode is connected to a point on said autotransformer which is on the output discharge tube anode side of one of said deflection yoke connections whereas said damping discharge tube heater is connected to a point on said autotransformer which is on the output discharge tube cathode side of said one deflection yoke connection to said autotransformer.

9. In a deflection system for a cathode ray tube and associated therewith an electromagnetic deflection yoke suitable for excitation from a deflection output discharge tube, the combination comprising an autotransformer having a first winding tap thereon considered as an impedance datum tap, a second, third, fourth, fifth and sixth taps on said autotransformer winding representing progressively higher impedance levels on said autotransformer winding relative to said first datum tap, a first capacitance and variable inductance connected in series with one another to form a control configuration, connections placing said control configuration in series with that portion of the autotransformer winding embraced by said first and fifth winding taps, connections placing the series combination of said autotransformer winding and said control configuration directly in series with the anode-cathode circuit of the deflection output discharge tube, connections for placing the deflection yoke in shunt with at least a portion of the autotransformer winding residing between the first and third taps, a damping device having at least a heater, cathode and anode, a connection from said damping device anode to a point on said autotransformer winding residing between said third and fifth winding taps, a connection from said damping device heater to a point on said transformer winding residing between said first and third winding taps, and a connection from said damping device anode to the variable inductance extremity of said first capacitance.

10. Apparatus according to claim 9 where there is additionally provided voltage rectifying means connected with a point on said autotransformer winding residing between said fifth and sixth winding taps whereby a unidirectional voltage is developed whose value is dependent upon the setting of said variable inductance.

11. Apparatus according to claim 9 where there is additionally provided a power transformer having a primary winding and a secondary winding electrically insulated from one another, said secondary winding being further insulated from other circuit potentials, and connections from said power transformer secondary winding to said damping device heater for excitation thereof.

12. Apparatus according to claim 10 where there is additionally provided a second variable inductance connected in shunt with a portion of the autotransformer winding whereby the amplitude of yoke deflection currents may be varied.

13. A cathode ray tube deflection arrangement comprising in combination, a deflection output discharge tube having at least an anode and cathode, a source of anode polarizing potential for said output discharge tube, an autotransformer having a winding indexed at various impedance levels, said winding having a first index regarded as an impedance datum and a second, third, fourth, fifth and sixth indexes defining progressively higher impedance levels relative to said first datum index, a first capacitor, a variable inductance, connections placing the autotransformer winding defined between said first and fifth impedance levels in series with said first capacitance and variable inductance to form a combination, a connection from said output discharge tube anode to said autotransformer winding in the vicinity of said fifth impedance level, a connection from said variable inductance to said source of anode polarizing potential, connections for placing an electromagnetic deflection yoke in shunt with at least a portion of the autotransformer winding residing between said first and third impedance levels, a damping device having an anode and a cathode, a connection from said damping device cathode to a point on said autotransformer winding in the vicinity of said fourth impedance level, and a connection from said damping device anode to a point on said variable inductance.

14. Apparatus according to claim 13 wherein there is additionally provided another variable inductance in shunt with a portion of said autotransformer winding whereby the amplitude of the deflection currents supplied to the damping device may be varied.

15. Apparatus according to claim 13 wherein there is additionally provided voltage rectifying means connected with that portion of the autotransformer winding residing between said fifth and sixth impedance levels whereby a unidirectional potential is developed which is a function of the LC ratio between said first capacitance and said variable series inductance.

16. Apparatus according to claim 15 wherein said damping device is additionally provided with a heater and a connection from said heater to a point on said autotransformer residing between said first and fourth impedance levels.

EDWIN L. CLARK.
CLYDE W. HOYT.

REFERENCES CITED

The following references are of record in the file of this patent:

UNITED STATES PATENTS

| Number | Name | Date |
|---|---|---|
| 2,299,571 | Dome | Oct. 20, 1942 |
| 2,360,697 | Lyman | Oct. 17, 1944 |
| 2,440,418 | Tourshou | Apr. 27, 1948 |
| 2,443,030 | Foster | June 8, 1948 |